(12) United States Patent
Su et al.

(10) Patent No.: US 10,837,244 B2
(45) Date of Patent: Nov. 17, 2020

(54) METHOD FOR DETERMINING A CONCENTRATION OF SOLID PARTICLES

(71) Applicant: TOTAL SA, Courbevoie (FR)

(72) Inventors: Kun Su, Idron (FR); Jean-Yves Lansot, Pau (FR); Atef Onaisi, Idron (FR)

(73) Assignee: TOTAL SA, Courbevoie (FR)

( * ) Notice: Subject to any disclaimer, the term of this patent is extended or adjusted under 35 U.S.C. 154(b) by 431 days.

(21) Appl. No.: 15/570,038

(22) PCT Filed: Apr. 27, 2015

(86) PCT No.: PCT/IB2015/000852
§ 371 (c)(1),
(2) Date: Oct. 27, 2017

(87) PCT Pub. No.: WO2016/174488
PCT Pub. Date: Nov. 3, 2016

(65) Prior Publication Data
US 2018/0112477 A1 Apr. 26, 2018

(51) Int. Cl.
*G06F 30/20* (2020.01)
*E21B 21/00* (2006.01)
(Continued)

(52) U.S. Cl.
CPC .......... *E21B 21/003* (2013.01); *E21B 33/138* (2013.01); *E21B 41/0092* (2013.01);
(Continued)

(58) Field of Classification Search
None
See application file for complete search history.

(56) References Cited

U.S. PATENT DOCUMENTS 7,003,439 B2* 2/2006 Aldred .................... E21B 44/00
703/10
9,109,992 B2* 8/2015 Wang .................... E21B 33/138
(Continued)

FOREIGN PATENT DOCUMENTS

WO WO 2012/170382 A1 12/2012
WO WO 2015/047389 A1 4/2015

OTHER PUBLICATIONS

PCT International Search Report for PCT/IB2015/000852, dated Feb. 5, 2016, 4 pages.
(Continued)

*Primary Examiner* — Kibrom K Gebresilassie
(74) *Attorney, Agent, or Firm* — Patterson Thuente Pedersen, P.A.

(57) ABSTRACT

A method for determining a concentration of solid particles in a drilling fluid. The method comprises determining, based on a received dimension of a section of a fracture, a plurality of wirelines each having a diameter. For each wireline, the method determines if a solid particle or a part of a fluid is in the current wireline. If it is determined that a solid particle is in the wireline, then determining whether the current wireline is sealed. These steps are reiterated. The method further comprises determining a volume of injected fluid into the fracture and comparing the determined volume with a reference to determine if a fracturing criterion is met. If the fracturing criterion is met, it is possible to modify the current concentration of solid particles.

11 Claims, 3 Drawing Sheets

(51) Int. Cl.
    *E21B 33/138* (2006.01)
    *E21B 41/00* (2006.01)
    *G06F 111/10* (2020.01)
    *E21B 49/08* (2006.01)
    *E21B 43/267* (2006.01)

(52) U.S. Cl.
    CPC ............ *G06F 30/20* (2020.01); *E21B 43/267* (2013.01); *E21B 49/0875* (2020.05); *G01V 2210/646* (2013.01); *G06F 2111/10* (2020.01)

(56) References Cited

U.S. PATENT DOCUMENTS

| | | | | |
|---|---|---|---|---|
| 2002/0103630 | A1* | 8/2002 | Aldred | E21B 44/00 703/10 |
| 2005/0222852 | A1* | 10/2005 | Craig | E21B 49/008 166/305.1 |
| 2007/0223999 | A1* | 9/2007 | Curlett | E21B 43/17 405/55 |
| 2010/0181073 | A1* | 7/2010 | Dupriest | E21B 21/00 166/308.1 |
| 2010/0264915 | A1* | 10/2010 | Saldungaray | E21B 49/087 324/303 |
| 2011/0198078 | A1* | 8/2011 | Harrigan | E21B 49/087 166/254.2 |
| 2011/0266056 | A1* | 11/2011 | Pop | E21B 49/08 175/50 |
| 2011/0284245 | A1* | 11/2011 | Crandall | C09K 8/502 166/386 |
| 2013/0143777 | A1* | 6/2013 | Wang | G01N 19/08 507/204 |

OTHER PUBLICATIONS

PCT Written Opinion of the ISA for PCT/IB2015/000852, dated Feb. 5, 2016, 6 pages.

Alan Calder et al: "SPE 123832 How to Drill Mature, Depleted Reservoirs Without Downhole Losses Using Engineered Drilling Fluids", SPE Offshore Europe Oil & Gas Conference & Exhibition (Aberdeen), Sep. 8, 2009 (Sep. 8, 2009), pp. 8-11, XP055243527, Aberdeen, UK DOI: 10.2118/123832-MS ISBN: 978-1-55563-261-8.

* cited by examiner

METHOD FOR DETERMINING A CONCENTRATION OF SOLID PARTICLES

RELATED APPLICATIONS

The present application is a National Phase entry of PCT Application No. PCT/IB2015/000852, filed Apr. 27, 2015, said application being hereby incorporated by reference herein in its entirety.

FIELD OF THE INVENTION

The present invention relates to the domain of well stabilization and more specifically to the domain of the prevention of drilling fluid loss during a drilling.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

When drilling through a depleted reservoir, there is a high risk of loss of the drilling fluid (e.g. mud) due to the disturbance in situ stress generated by the pressure drop of the fluid in the reservoir.

In order to ensure both the stability of the drilling and well control, the density of drilling fluid may be maintain between two limit values:
- a lower limit to ensure the stability of the well walls, and
- an upper limit to ensure that the preexisting fractures in geological formations are not opened and that no additional fracture are created. Indeed, these fractures may lead to the loss of control of the drilling fluid in the well.

When drilling a depleted reservoir, the upper limit level may be lowered due to the reservoir pressure drop.

The difference/margin between the upper and the lower limits, which is commonly known as the Mud Weight Window may become very narrow or negative in the case of a heavily depleted reservoir with a cap rock in clay (shale) formation.

Therefore, there is a need to increase the upper limit of the drilling fluid density by performing wellbore strengthening and therefore to be able to drill the cap rock shale and to drill the depleted reservoir with a single drill diameter (drilling with a single drill diameter has a huge impact on the cost of drilling).

In order to increase the upper limit, it is possible to add solid particles in the drilling fluid (i.e. to increase the concentration of solid particles). These solid particles may fill the fractures as soon as they occur and/or may seal preexisting fractures when they are trying to reopen.

The amount/concentration and the size distribution (PSD: particle size distribution) of solid particles to be added in the drilling fluid may be two key parameters (most of the time, the PSD are a predetermined parameter fixed by a provider of solid particles). Indeed, it is advantageous that the particle size in the slurry is important enough to create a bridge in the fracture, and that the number of particles (volumetric content) is sufficient to quickly seal fractures before they spread.

To seal a fracture means that no fluid is able to infiltrate into the fracture through the created bridge (or only a little part).

SUMMARY OF THE INVENTION

The invention relates to a method for determining at least an adequate concentration of solid particles in drilling fluid, wherein the method comprises:
  /a/ receiving a dimension of a section of a fracture;
  /b/ receiving at least a current concentration of solid particles in the drilling fluid;
  /c/ determining, based on the received dimension, a plurality of wirelines, each determined wireline having a diameter;
  /d/ for each current wireline in the determined wirelines:
    /d1/ determining if a solid particle or a part of a fluid is in the current wireline based at least on the current concentration;
    /d2/ if it is determined in step /d1/ that a solid particle is in the current wireline, determining whether the current wireline is sealed;
    /d3/ reiterating steps /d1/, d2/ and /d3/ based on a reiteration criterion;
  /e/ determining a volume of injected fluid into the fracture based on iterations of step /a/ where it is determined that a part of a fluid is in the current wireline;
  /f/ comparing said determined volume with a reference volume to determine if a fracturing criterion is met;
  /g/ if the fracturing criterion is met, modifying at least the current concentration of solid particles in the drilling fluid and reiterating steps /c/, /d/, /e/, /f/, /g/;
  /h/ if the fracturing criterion is not met, outputting the current concentration of solid particles in the drilling fluid.

The dimension of the section of the fracture may be expressed as a surface, a diameter, a radius, etc.

If the received dimension is a surface, it is possible to determine the wirelines so that all wirelines grouped together forms a tube of the same surface as the received dimension. If the received dimension is a length, it is possible to do the same but after converting this length into a surface (for instance, by considering that the fractures have a rectangular or circular section).

The determined wirelines are only a representation of the fracture for the modeling. No actual wireline exists in a fracture.

Steps /d1/ to /d3/ are executed for every determined wirelines or for a subset of the determined wirelines. Each iteration of such steps represents a given period of time.

The determination of the step /d1/ may be a random draw. For instance, if the concentration of the solid particles is 10% in the drilling fluid, the probability of determining that a solid particle is the wireline is 0.1 and the probability of determining that a part of the drilling fluid is the wireline is 0.9.

Once it is determined that a solid particle is inside the wireline, it is possible to determine the diameter of said particle: the determined diameter may be a predetermined value or may be a random value drawn in a distribution.

The determined volume may be used to determine whether the fracture is extending/increasing. Indeed, if the injected volume is greater than the fracture volume (for instance), the fracture opens and increases to allow the injection of the fluid. It is also possible to take into account the seepage rate in the formation and thus to take into account the derivative of the volume (e.g. when the volume of the fracture has been injected).

Then, it is possible to determine a concentration of solid particles that are adequate to quickly plug the existing fractures and thus:
avoid the leakage of the mud during the drilling;
ensure both the stability of the drilling and well control.

In a possible embodiment, a sum of surfaces of sections of the wirelines may be equal to a surface of the section of the fracture.

Therefore, the modelling of the fracture by a plurality of fracture may be adequate.

The method may also comprise receiving a distribution of dimensions of solid particles in the drilling fluid.

The determination of step /d1/ may be further based on the received distribution.

For instance, the distribution of dimensions may be a distribution of diameter/radius of solid particles.

The method may also comprise /g/ the determination of adequate ratio between several plugging materials.

In addition, the determination of step /d2/ may comprise the determination of a dimension of the solid particle in the wireline.

This determination may be based on a received distribution.

In one possible embodiment, the wireline may be determined to be sealed if the determined dimension of the solid particle in the wireline is higher than a predetermined value function of the diameter of current wireline.

In another possible embodiment, the wireline may be determined to be sealed if the determined dimension of the solid particle in the wireline is within a predetermined interval around the diameter of current wireline.

Alternatively or in combination with other embodiments, the wireline may be determined to be sealed if a number of solid particles determined to be in the current wireline and matching a blocking criterion is above a predetermined value.

For instance, the blocking criterion may be that the dimension of the particle is greater than X % of the diameter of the wireline (X being for instance 75, 85 or 100). The number of particles needed to seal the wireline may be a function of the size of the particle or of the diameter of the wireline (e.g. if the critical size of the particle is 85% of the diameter of the wireline, 10 particles may be needed to seal the wireline; if the critical size of the particle is 70% of the diameter of the wireline, 5 particles may be needed to seal the wireline; if the size of the particle is 95% of the diameter of the wireline, 2 particles may be needed to seal the wireline; etc.).

In addition, the reiteration criterion may comprise at least one condition in the following conditions:
if the wireline is determined to be sealed;
if the number of reiterations for a current wireline exceeds a predetermined value;
if the number of reiterations for all wirelines exceeds a predetermined value.

Furthermore, the determination of the volume of step /e/ may be based on a number of iterations of step /a/ where it is determined that a part of a fluid is in the current wireline and based on a unitary volume that is injected for a single iteration.

The fracturing (fracture propagation) criterion may comprise at least one condition in the following conditions:
if the determined volume is higher than a predetermined volume;
if the derivative of the determined volume is higher than a predetermined value;
if the derivative of the determined volume is higher than a predetermined value for iterations higher than a given iteration number.

A second aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
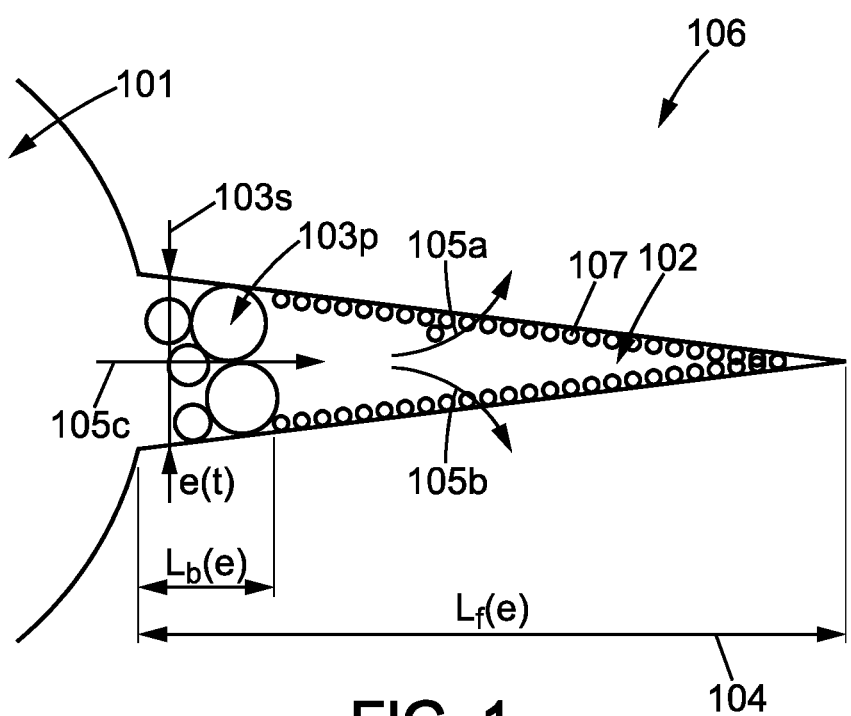
FIG. 1 is a representation of a sealed fracture in a well.

FIG. 1 is a representation of a sealed fracture 102 in a well 101.

By adding solid particles having predesigned size distribution and volumetric content, it is possible to prevent fracture propagation while drilling above the fracture initiation pressure.

The solid particles added in the drilling fluid may have two roles:
plugging the fracture entry as rapidly as possible at the beginning of fracture initiation in order to reduce the fracture's conductivity at its entry and then to stop the fracture propagation;
increasing the hoop stress by placing the some particles inside the fracture. The wellbore strength to sustain the drilling fluid pressure is then enhanced.

For instance, the fracture 102 may have a length of $L_f(e)$ (arrow 104) and an opening (width) of e(t) (arrow 103s) ($L_f(e)$ may be, for instance, ruled by the relation given by Sneddon, 1945).

In particular, the fracture may be sealed by a plug 103p that comprises a set/conglomerate of solid particles: this plug 103p may create a hermetic or semi-hermetic seal (with a permeability K). The size of the plug is noted $L_b(e)$ or $L_b$.

The opening e(t) may determine the size of solid particles to be added in the drilling fluid.

The volume of fracture 102 may determine the volumetric concentration of the solid particles to be added. The difference between injection volume $V_{inj}$ (arrow 105c) and seepage volume $V_{leak}$ (105a and 105b) may be less than the fracture volume, otherwise (i.e. after having filled the fracture volume, $q_{leak} < q_{inj}$, with $q_{leak}$ the seepage rate and $q_{inj}$ the injection rate), the fracture continues to propagate.

The injection volume may be function of the permeability K of the plug 103p at the entry of the fracture (the permeability may be a constant value or a value function of cumulated LCM). The injection rate $q_{inj}$ through the fracture entry (LCM bridge) may be calculated with the relationship:

$$q_{inj} = \frac{K(t)}{\mu} \frac{P_{ecd} - P_b}{L_b} e$$

where $P_{ecd}$ the drilling fluid pressure, $P_b$ the pressure in the fracture (for instance, $P_b = \alpha P_{ecd}$ with $\alpha$ in the range [0.95, 0.99]), $\mu$ the viscosity of the drilling fluid without any solid particles, e the fracture width, $L_b$ being thickness of the bridge, for instance in the range [1 mm, 2 mm].

In addition, the seepage rate throught the fracture's walls into the formation may be computed as:

$$q_{leak} = 4\pi C_L \frac{L_f^2}{t_p^{0.5}}$$

where $C_L$ is the fracture leak-off coefficient which is function of the formation (106) permeability and $t_p$ is the time after the opening of the fracture.

Thanks to the above formula, it is then possible to determine the limit value of $L_f$ for which $q_{inj} = q_{leak}$ (and the corresponding opening value e).

Nevertheless, due to the uncertainties of various parameters involved in fracture length $L_f$ calculation, sensitivity calculation may be carried out using analytical solution. For instance, thousands simulations may be realized with random sampling of input data.

Therefore, no single value of $L_f$ is determined: a distribution of limit values $L_f/e$ may thus be determined.

Figure 2:
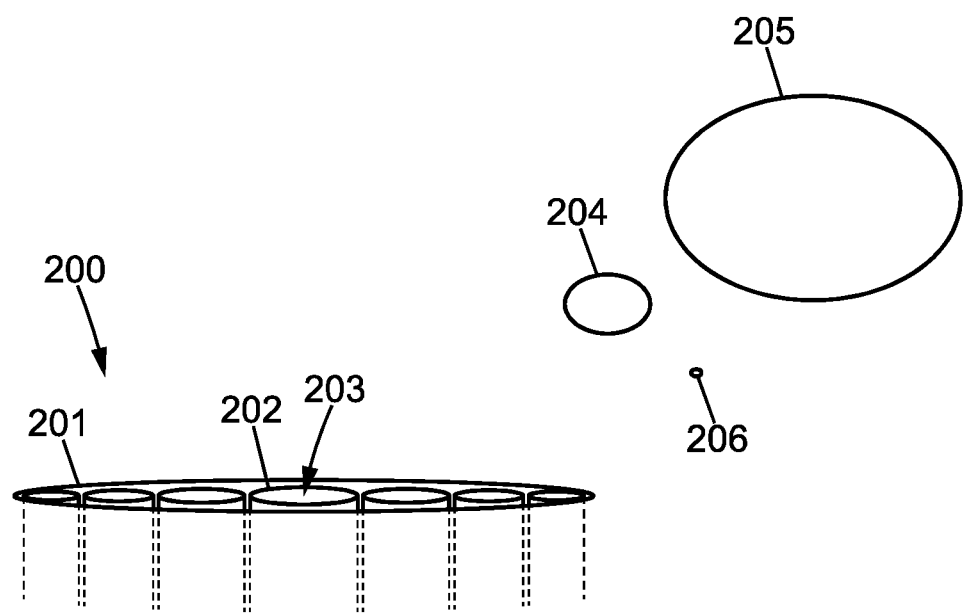
FIG. 2 is a representation of the model used for modeling the formation of the plug.

FIG. 2 is a representation of the model 200 used for modeling the formation of the plug.

The opening 201 of the fracture is modeled as N virtual thin wirelines (202) as shown in FIG. 2: each wireline may have a diameter function or equal to the fracture opening (or fracture width). The drilling fluid/solid particles may circulate into these wirelines (arrow 203).

The dimension of the section of the wirelines may be identical (e.g. having the same diameter) or may be drawn according to a given distribution. The addition of sections of all wirelines may be, for instance, sensibly equal to the surface of the opening of the fracture.

When a solid particle enters a wireline, this particle may seal the wireline:
- if the size of the particles is close to the dimension of the wireline (i.e. within a range around the dimension of the wireline, e.g. particle 204). If the particle is too small (e.g. particle 206), nothing happen. If the particle is too big (e.g. particle 205), the particle cannot enter the wireline and the particle is not considered to have any impact on the flow in the wireline;
- this sealing may happen only after a predetermined number of times a particle close to the dimension of the wireline enters the wireline (the predetermined number of time may be function of the size of the particles and/or of the dimension of the fracture/wireline, for instance, if the size of the particle is slightly bigger than the dimension of the wireline, only one particle may seal the wireline while if the size of the particle is slightly lower than the dimension of the wireline, two or three particles may be need to seal the wireline).

Figure 3A:
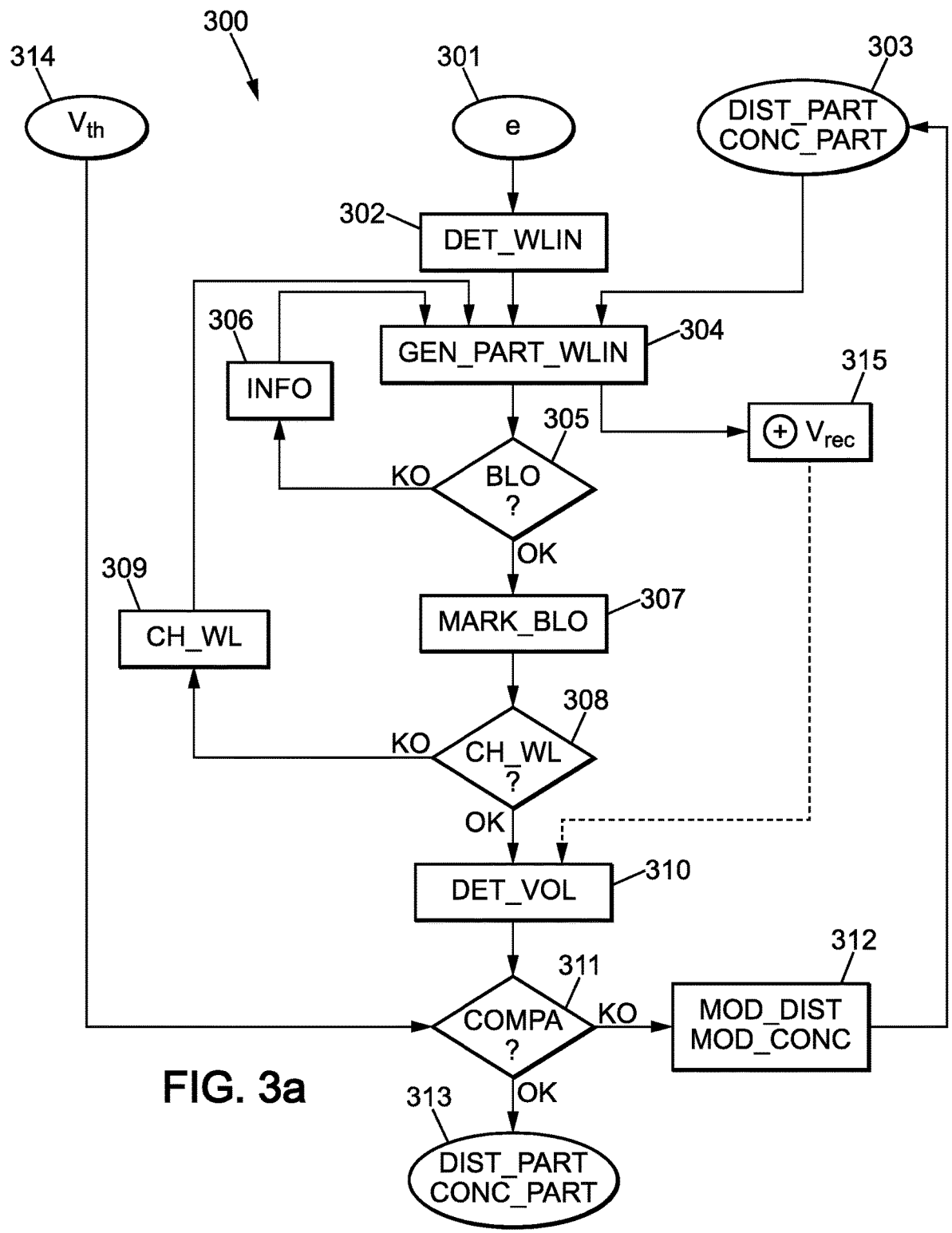
FIG. 3a is a flow chart describing a possible embodiment of the present invention.

FIG. 3a is a flow chart 300 describing a possible embodiment of the present invention. Part of this flow chart can represent steps of an example of a computer program.

When receiving the dimension of the opening e of the fracture (301, this opening value e may be computed as described in relation of FIG. 1), it is possible to determine (step 302) a plurality of wirelines as detailed above in relation of FIG. 2. Each wireline w has a diameter $d_w$. The diameter $d_w$ may be a constant function of the width of the fracture. The diameter of each wireline may be determined from the mean volume of a single particular calculated from the volume of all particles generated divided by total number of particles in all wirelines.

In addition, it is possible to obtain a distribution 303 of the solid particles that is expected to be added into the drilling fluid. Most of the time solid particles provided by industrial have a known distribution (for instance the percentage of particles having a diameter below 10% of the mean diameter and the percentage of particles having a diameter below 90% of the mean diameter are known, the distribution being a logarithmic distribution, for example). Concentration of the solid particles associated with a given distribution is also provided (for instance, in part per billion or ppb or in percentage).

It is possible to receive a plurality of distribution and a plurality of concentration as it is possible to add in the drilling fluid a plurality of industrial predetermined solid particles. Therefore, it is possible to create a mix with said particles from different types/different industrial providers.

Therefore, a generation of a flow in each wireline is computed (step 304). In order to do so, a first wireline (with a diameter $d_w$) is selected. It is then determined (random draw according to the concentration(s) and the distribution (s) of the solid particles in the drilling fluid) if the substance that enters the wireline is a solid particles or a part of the drilling fluid:
- if the substance is a part of the drilling fluid, the wireline is not sealed (test 305, output KO) and a counter $V_{rec}$ is incremented (step 315): this counter $V_{rec}$ represent a value proportional to the volume of drilling fluid entering the fracture;
- if the substance is a solid particle having a diameter $d_{sp}$ (the diameter of the solid particles is, for instance, randomly drawn into the solid particle diameter distribution(s)), the diameter $d_{sp}$ is compared to the diameter of the wireline $d_w$ in order to determine if the particle seals the wireline, (test 305).
  - if $d_{sp}$ is "too" big compared to $d_w$ (for instance $d_{sp} > 5 \cdot d_w$, or $d_{sp}$ being bigger than a predetermined number of times $d_w$), the particles is considered as being rejected (the particles do not enter into the wireline) and is not blocked into the wireline;
  - if $d_{sp}$ is "too" small compared to $d_w$ (for instance $d_{sp} < 0.85 \cdot d_w$, or $d_{sp}$ being smaller than a predetermined number of times $d_w$), the particles is not blocked into the wireline;
  - otherwise, the particle may be blocked into the wireline (e.g. if $$\frac{d_{sp}}{d_w} < x_1,$$

the solid particle seals instantaneity the wireline, $$\frac{d_{sp}}{d_w} < x_2,$$

the solid particle seals the wireline after two passages of such solid particles, $$\frac{d_{sp}}{d_w} < x_3,$$

the solid particle seals the wireline after three passages of such solid particles, etc. with $x_1$, $x_2$, $x_3$, etc. being predetermined values). If it is determined that the particle does not seal the wireline at that current iteration (test 305, output KO), a number of iterations (see above) may be noted (step 306) in a memory or in a database to be able to determine if the wireline is to be sealed during a next iteration.

It is also possible to follow simpler rules (for instance, the wireline is sealed if N solid particles having a diameter above a given value enters the wireline (N a predetermined integer >0); the wireline is not sealed in the other cases).

If the wireline is sealed (see above), a flag may be set in relation to this wireline (step 307).

Once the current wireline is sealed, and if at least one wireline has not been sealed (test 308, output KO), a new wireline (which has not been sealed) is selected as the current wireline (step 309) and the above steps (step 304 to 308) are reiterated.

Once the current wireline is sealed, and if all wirelines has been sealed (test 308, output OK), the volume injected $V_{inj}$ in the fracture is determined (step 310). This volume is function of the volume $V_{rec}$ incremented in step 315 (for instance $V_{inj}=V_{rec} \cdot U_v$ where $U_v$ is the unitary volume injected per iteration (i.e. unitary period of time)).

The test 308 may also take in account a maximal number of iterations: if the number of iterations is the maximal number of iterations, it is possible to quit the iteration loop (the number of iterations may, indeed, be linked to the determined volume in step 310).

This volume (determined in step 310) may be a unique value but may also be a function of the time (representing the evolution of the injected volume with the time/the iteration number).

Figure 3B:
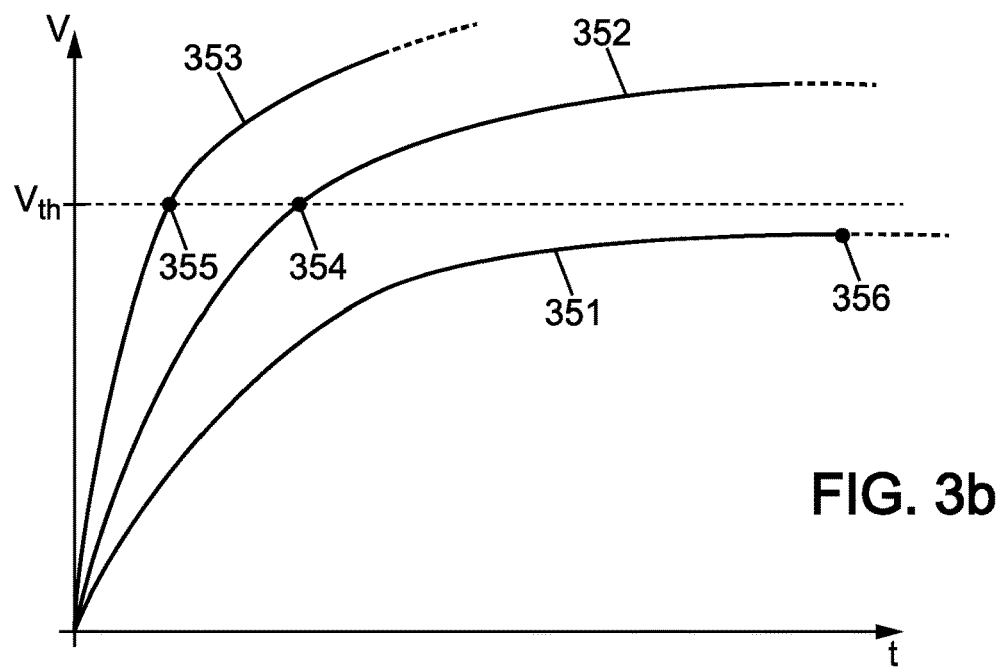
FIG. 3b presents various functions that relate an injected volume in the fracture to the time.

The volume may thus be compared with a threshold value $V_{th}$ representing, for instance, the volume of the fracture 102 (determined, for instance, thanks to the value e and $L_f$). If the volume computed in step 310 is a function (e.g. 351, FIG. 3b), the value compared with the threshold value $V_{th}$ may be the maximal value of the function (e.g. 356, FIG. 3b). If the threshold value $V_{th}$ is lower than the compared value (test 311, output KO), it is possible to modify the distribution of solid particles and/or the concentration(s) of the solid particles (step 312, for instance by increasing the concentration (s) by a predetermined amount) and to reiterate above steps. If the threshold value $V_{th}$ is bigger than to the compared value (test 311, output OK), the current distribution and the current concentration of the solid particles may be output.

In another embodiment, and if the volume computed in step 310 is a function (e.g. 352 or 353, FIG. 3b), it is possible to determine the derivative value of the function for a value of the function corresponding to the threshold value $V_{th}$ (e.g. respectively 354 or 355). This derivative value is related to the maximal flow into the fracture. If the derivative value is bigger than a predetermined value (test 311, output KO, meaning that the flow in the fracture is too important), it is possible to modify the distribution of solid particles and/or the concentration of the solid particles (step 312, for instance by increasing the concentration by a predetermined amount) and to reiterate above steps. If the derivative value is lower than the predetermined value (test 311, output OK), the current distribution and the current concentration of the solid particles may be output. It is also possible to systematically modify the current distribution and/or the current concentration, for instance by dichotomy, to determine the values of concentration(s) and distribution(s) for which the derivative value is close enough to the predetermined value.

The predetermined value compared to the derivative value may be function of the flow of the seepage volume $V_{leak}$ (105a and 105b, FIG. 1).

Figure 4:
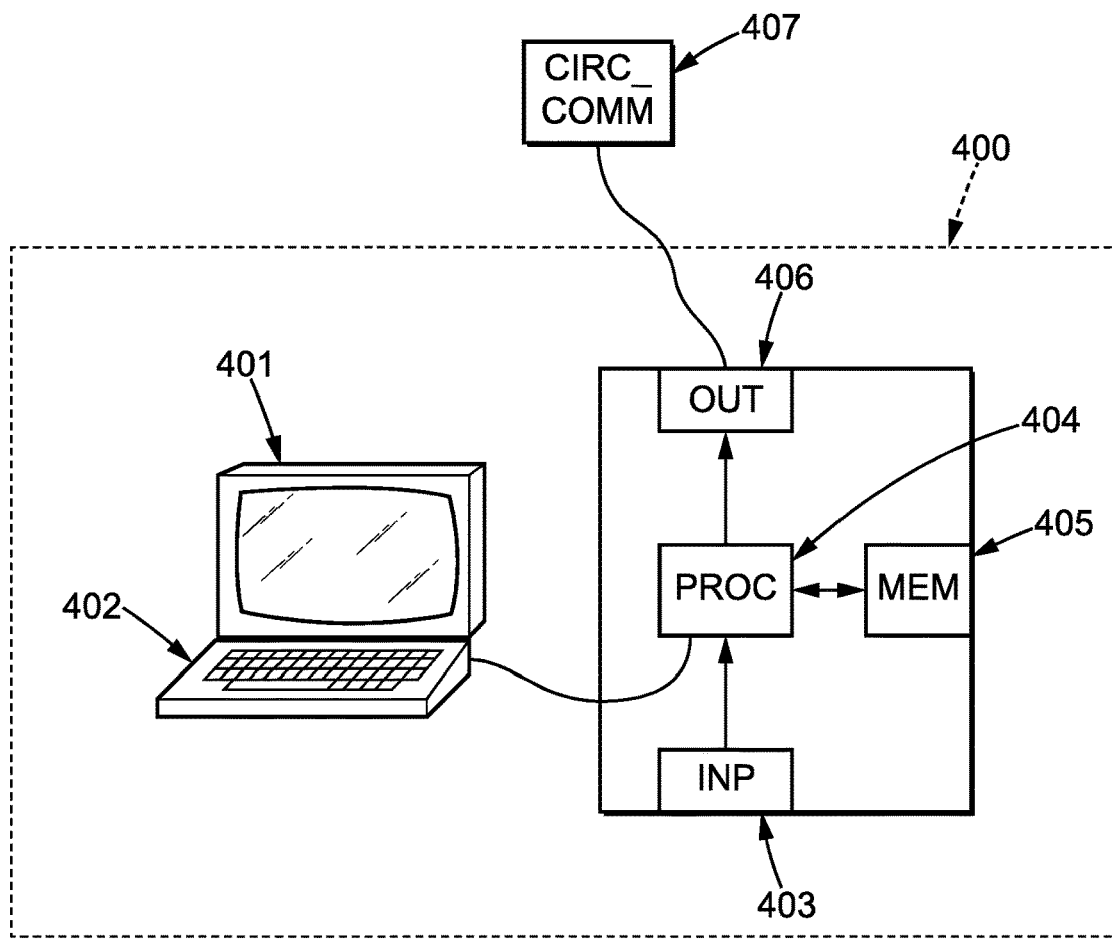
FIG. 4 is a possible embodiment for a device that enables the present invention.

FIG. 4 is a possible embodiment for a device that enables the present invention.

In this embodiment, the device 400 comprise a computer, this computer comprising a memory 405 to store program instructions loadable into a circuit and adapted to cause circuit 404 to carry out the steps of the present invention when the program instructions are run by the circuit 404.

The memory 405 may also store data and useful information for carrying the steps of the present invention as described above.

The circuit 404 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

This computer comprises an input interface 403 for the reception of data used for the above method according to the invention and an output interface 406 for providing the distribution and or the concentration of the solid particles to be used in the drilling fluid.

To ease the interaction with the computer, a screen 401 and a keyboard 402 may be provided and connected to the computer circuit 404.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

The invention claimed is:

1. A method for determining a concentration of a plurality of solid particles in a drilling fluid, wherein the method comprises:
   /a/ receiving a dimension of a section of a fracture;
   /b/ receiving at least a current concentration of solid particles in the drilling fluid;

/c/ determining, based on the received dimension, a plurality of wirelines, each determined wireline having a diameter;
/d/ for each current wireline in the determined wirelines:
/d1/ determining if a solid particle or a part of a fluid is in the current wireline based at least on the current concentration;
/d2/ if it is determined in step /d1/ that a solid particle is in the current wireline, determining whether the current wireline is sealed;
/d3/ reiterating steps /d1/, /d2/ and /d3/ based on a reiteration criterion;
/e/ determining a volume of an injected fluid into the fracture based on iterations of step /a/ where it is determined that a part of a fluid is in the current wireline;
/f/ comparing said determined volume with a reference to determine if a fracturing criterion is met;
/g/ if the fracturing criterion is met, modifying at least the current concentration of solid particles in the drilling fluid and reiterating steps /c/, /d/, /e/, /f/ and /g/ ;
/h/ if the fracturing criterion is not met, outputting the current concentration of solid particles in the drilling fluid.

2. The method according to claim 1, wherein a sum of surfaces of sections of the wirelines is equal to a surface of the section of the fracture.

3. The method according to claim 1, wherein the method further comprises:
receiving a distribution of a dimension of solid particles in the drilling fluid;
and wherein the determination of step /d1/ is further based on the received distribution.

4. The method according to claim 1, wherein the determination of step /d2/ comprise the determination of a dimension of the solid particle in the wireline.

5. The method according to claim 4, wherein the wireline is determined to be sealed if the determined dimension of the solid particle in the wireline is higher than a predetermined value function of the diameter of current wireline.

6. The method according to claim 4, wherein the wireline is determined to be sealed if the determined dimension of the solid particle in the wireline is within a predetermined interval around the diameter of current wireline.

7. The method according to claim 1, wherein the wireline is determined to be sealed if a number of solid particles determined to be in the current wireline and matching a blocking criterion is above a predetermined value.

8. The method according to claim 1, wherein the reiteration criterion comprises at least one condition in the following conditions:
if the wireline is determined to be sealed;
if the number of reiterations for a current wireline exceeds a predetermined value;
if the number of reiterations for all wirelines exceeds a predetermined value.

9. The method according to claim 1, wherein the determination of the volume of step /e/ is based on a number of iterations of step /a/ where it is determined that a part of a fluid is in the current wireline and based on a unitary volume that is injected for a single iteration.

10. The method according to claim 1, wherein the fracturing criterion comprises at least one condition in the following conditions:
if the determined volume is higher than a predetermined volume;
if the derivative of the determined volume is higher than a predetermined value;
if the derivative of the determined volume is higher than a predetermined value for iterations higher than a given iteration number.

11. A non-transitory computer readable storage medium, having stored thereon a computer program comprising program instructions, the computer program being loadable into a data-processing unit and adapted to cause the data-processing unit to carry out the steps of claim 1 when the computer program is run by the data-processing device.

* * * * *